(12) United States Patent
Akiyama (10) Patent No.: US 10,216,077 B2
(45) Date of Patent: Feb. 26, 2019

(54) ILLUMINATION DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/906,247

(22) Filed: Feb. 27, 2018

(65) Prior Publication Data

US 2018/0259837 A1 Sep. 13, 2018

(30) Foreign Application Priority Data

Mar. 10, 2017 (JP) ................................. 2017-046277

(51) Int. Cl.
*G03B 21/20* (2006.01)
*G03B 21/00* (2006.01)

(52) U.S. Cl.
CPC ....... *G03B 21/2053* (2013.01); *G03B 21/204* (2013.01); *G03B 21/208* (2013.01); *G03B 21/2013* (2013.01); *G03B 21/2066* (2013.01); *G03B 21/2073* (2013.01); *G03B 21/006* (2013.01)

(58) Field of Classification Search
CPC ............ G03B 21/2053; G03B 21/2013; G03B 21/204; G03B 21/2066; G03B 21/2073; G03B 21/208; G03B 21/006

USPC ........................................................... 353/85
See application file for complete search history.

(56) References Cited

U.S. PATENT DOCUMENTS

2012/0050691 A1* 3/2012 Tsuda .................. G03B 21/204 353/31
2014/0111967 A1* 4/2014 Rehn ........................ F21V 9/40 362/84

FOREIGN PATENT DOCUMENTS

JP 2013-250494 A 12/2013

\* cited by examiner

*Primary Examiner* — Steven H Whitesell Gordon
*Assistant Examiner* — Jerry Brooks
(74) *Attorney, Agent, or Firm* — Oliff PLC (57) ABSTRACT

An illumination device includes a light source unit including a plurality of light source regions and outputting a first color light, a light branch element that reflects a light output from at least one light source region of the plurality of light source regions and branches the first color light into a first component and a second component traveling in different directions from each other, and a wavelength conversion element provided in an optical path of the second component and excited by the second component to output a fluorescent light containing a second color light. A position of the light branch element in an arrangement direction of the plurality of light source regions is adjustable.

8 Claims, 6 Drawing Sheets

ILLUMINATION DEVICE AND PROJECTOR

BACKGROUND

1. Technical Field

The present invention relates to an illumination device and projector.

2. Related Art

Projectors including light sources using fluorescent lights obtained by irradiation of fluorescent materials with excitation lights output from light emitting devices such as semiconductor lasers as illumination lights are proposed.

Patent Document 1 (JP-A-2013-250494) discloses a light source including a solid-state light source unit having a plurality of semiconductor lasers that output blue lights, a dichroic mirror, a fluorescent material layer, a wave plate, a diffusion plate, and a reflection plate. Part of the semiconductor lasers output P-polarized lights for the dichroic mirror and the other semiconductor lasers output S-polarized lights for the dichroic mirror. The P-polarized lights are transmitted through the dichroic mirror and enter the diffusion plate and become blue diffused lights. The S-polarized lights are reflected by the dichroic mirror and enter the fluorescent material layer, and generate yellow fluorescent lights. The yellow fluorescent lights and the blue diffused lights are combined by the dichroic mirror and become white lights.

In the above described light source, suppose that the plurality of semiconductor lasers that output P-polarized lights form a single series circuit. If e.g. an open failure (disconnection mode failure) occurs in the series circuit, no current is supplied to the series circuit and no blue diffused light is generated. As a result, it is impossible for the light source to fulfill the function of outputting white light.

As described above, when an amount of light output from one light source region of the light source unit is lower by a predetermined amount or more, there is a problem that it is impossible for the light source to fulfill a desired function.

SUMMARY

An advantage of some aspects of the invention is to provide an illumination device that may fulfill a desired function even when an amount of light output from part of light source regions is lower by a predetermined amount or more. Another advantage of some aspects of the invention is to provide a projector including the illumination device.

An illumination device according to an aspect of the invention includes a light source unit including a plurality of light source regions and outputting a first color light, a light branch element that reflects a light output from at least one light source region of the plurality of light source regions and branches the first color light into a first component and a second component traveling in different directions from each other, and a wavelength conversion element provided in an optical path of the second component and excited by the second component to output a fluorescent light containing a second color light, wherein a position of the light branch element in an arrangement direction of the plurality of light source regions is adjustable.

In the illumination device according to the aspect of the invention, when a failure occurs in part of the light source regions and the amount of light from the light source region is reduced by the predetermined amount or more, the position of the light branch element may be moved into the optical path of the light from the other light source region. Accordingly, any one of the first component and the second component is not completely output.

The illumination device according to the aspect of the invention may further include a first photodetector into which a part of the first component enters, a light branch element moving device that moves the light branch element, and a light branch element control device that controls the light branch element moving device, wherein the light branch element control device may have a function of changing a component to be branched as the first component of the first color light by controlling the light branch element moving device to move the light branch element in the arrangement direction when output from the first photodetector is reduced by a predetermined amount or more.

According to this configuration, when the amount of light of the first component is reduced by the predetermined amount or more, the movement of the light branch element is automatically made.

The illumination device according to the aspect of the invention may further include a light source control device for controlling output of the respective plurality of light source regions.

According to this configuration, the change of the ratio between the output of the first component and the output of the second component before and after the position of the light branch element is moved may be adjusted by the light source control device.

The illumination device according to the aspect of the invention may further include a light sensor unit into which a part of the first component and a part of the second color light enter, wherein the light source control device may be adapted to control the output of the respective plurality of light source regions based on output from the light sensor unit.

According to this configuration, the adjustment of the ratio between the output of the first component and the output of the second color light is automatically made by the light source control device, and the color of the output light is adjusted.

In the illumination device according to the aspect of the invention, the plurality of light source regions may include a first light source region having first output, a second light source region having second output, and a third light source region having third output smaller than the second output, and the light branch element control device may have a function of changing the component to be branched as the first component of the first color light from the light output from the first light source region to the light output from the third light source region by controlling the light branch element moving device.

According to this configuration, excessive increase of the ratio of the output of the first component to the output of the second color light when the light branch element is moved may be easily suppressed.

A projector according to an aspect of the invention includes the illumination unit according to the aspect of the invention, a light modulation device that modulates the first component and the fluorescent light output from the illumination device according to image information to form an image light, and a projection system that projects the image light.

According to the projector of the aspect of the invention, an image in a desired color may be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, one embodiment of the invention will be explained using the drawings.

A projector of the embodiment is an example of a liquid crystal projector including a light source using semiconductor lasers.

Note that, in the following drawings, for visibility of the respective component elements, scaling of dimensions may be made different depending on the configuration elements.

A projector 1 of the embodiment is a projection image display apparatus that displays color images on a screen (projected surface) SCR. The projector 1 uses three light modulation devices corresponding to respective color lights of red light LR, green light LG, blue light LB. The projector 1 uses semiconductor lasers with which high-luminance and high-power lights may be obtained as light emitting devices of the light source.

Figure 1:
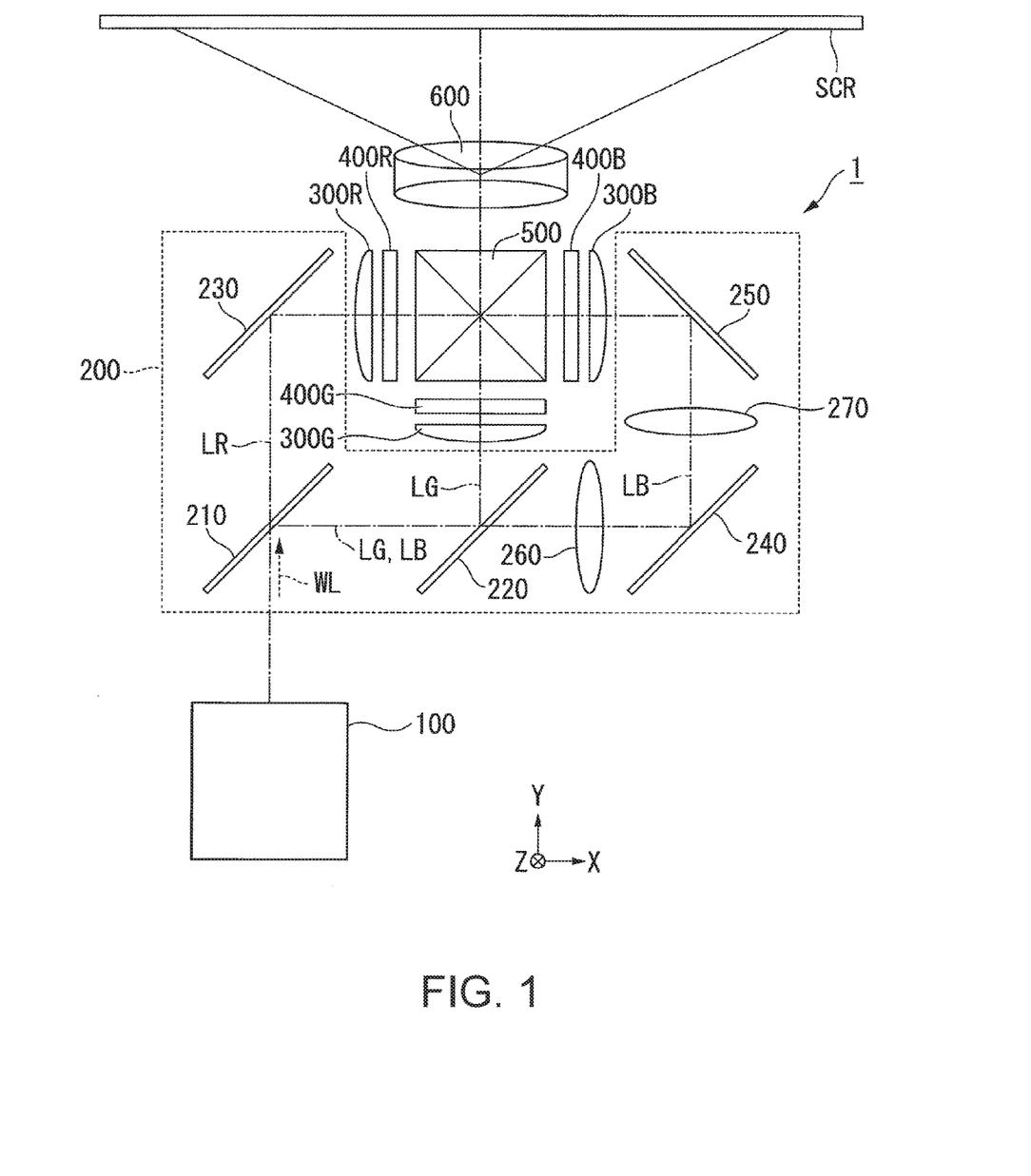
FIG. 1 is a schematic configuration diagram of a projector of one embodiment.

As shown in FIG. 1, the projector 1 includes an illumination device 100, a color separation and light guiding system 200, a light modulation device for red light 400R, a light modulation device for green light 400G, a light modulation device for blue light 400B, a cross dichroic prism 500, and a projection system 600. The light modulation device for red light 400R, the light modulation device for green light 400G, and the light modulation device for blue light 400B form a light modulation unit.

In the embodiment, the illumination device 100 outputs white illumination light WL containing a red light LR, a green light LG, and a blue light LB.

The color separation and light guiding system 200 includes a dichroic mirror 210, a dichroic mirror 220, a reflection mirror 230, a reflection mirror 240, a reflection mirror 250, a relay lens 260, and a relay lens 270. The color separation and light guiding system 200 separates the white illumination light WL from the illumination device 100 into the red light LR, the green light LG, and the blue light LB, and guides the red light LR, the green light LG, and the blue light LB to the respectively corresponding light modulation device for red light 400R, light modulation device for green light 400G, and light modulation device for blue light 400B.

A field lens 300R, a field lens 300G, a field lens 300B are provided between the color separation and light guiding system 200 and the light modulation device for red light 400R, the light modulation device for green light 400G, and the light modulation device for blue light 400B, respectively.

The dichroic mirror 210 passes the red light component and reflects the green light component and the blue light component. The dichroic mirror 220 reflects the green light component and transmits the blue light component.

The respective light modulation device for red light 400R, light modulation device for green light 400G, and light modulation device for blue light 400B include liquid crystal panels that modulate entering color lights according to image information and form images.

Note that light incident-side polarizers (not shown) are respectively provided between the field lens 300R, the field lens 300G, the field lens 300B and the light modulation device for red light 400R, the light modulation device for green light 400G, the light modulation device for blue light 400B. Light exiting-side polarizers (not shown) are respectively provided between the light modulation device for red light 400R, the light modulation device for green light 400G, the light modulation device for blue light 400B and the cross dichroic prism 500.

The cross dichroic prism 500 combines the respective image lights output from the respective light modulation device for red light 400R, light modulation device for green light 400G, and light modulation device for blue light 400B and forms a color image. The cross dichroic prism 500 has a nearly square shape in the plan view formed by bonding of four rectangular prisms and dielectric multilayer films are formed on the interfaces in a nearly X-shape on which the rectangular prisms are bonded.

The color image output from the cross dichroic prism 500 is enlarged and projected by the projection system 600 on the screen SCR.

Figure 2:
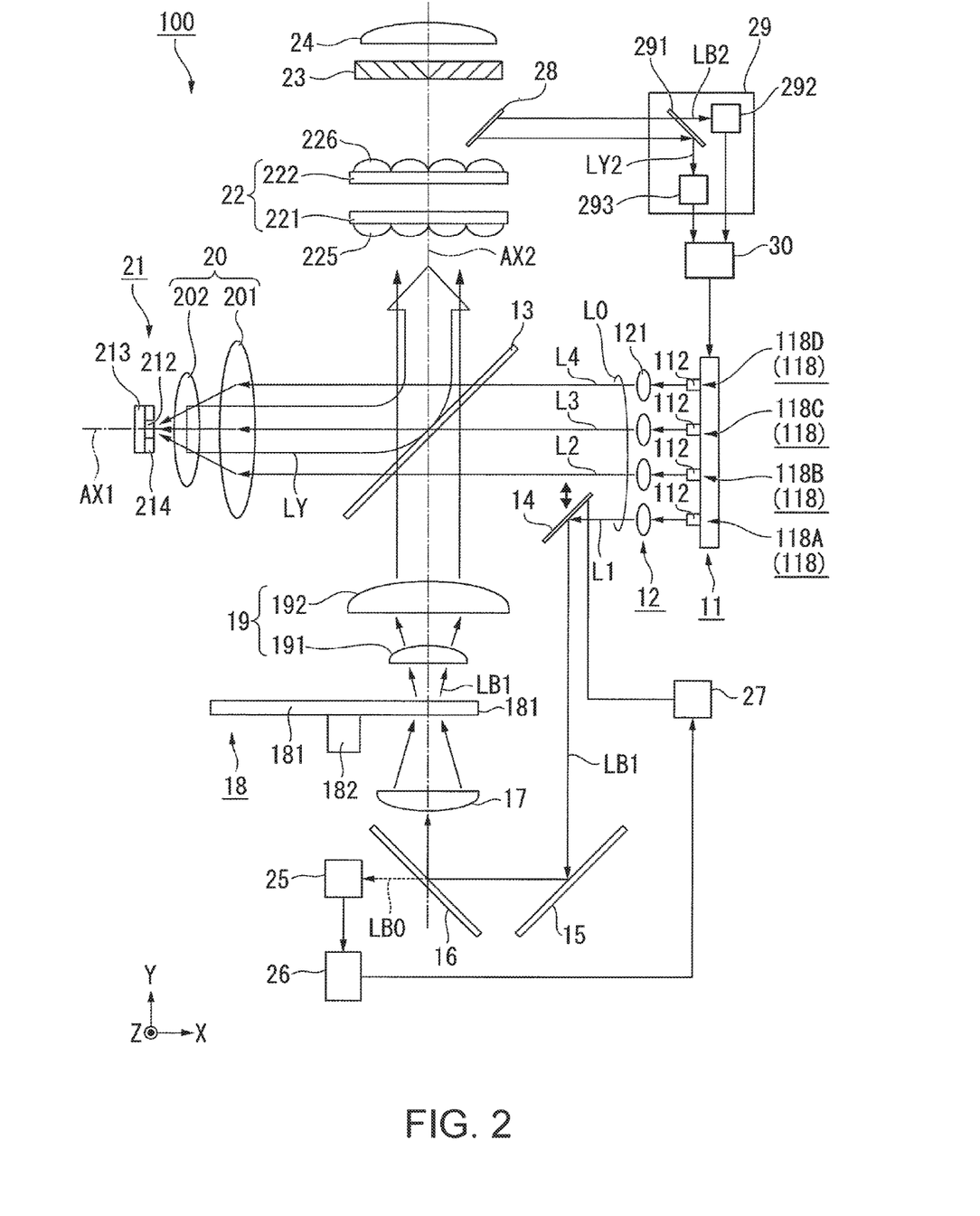
FIG. 2 is a schematic configuration diagram of an illumination device.

FIG. 2 is a schematic configuration diagram of the illumination device 100.

As shown in FIG. 2, the illumination device 100 includes a light source unit 11, a collimating system 12, a dichroic mirror 13, a branch mirror 14 (light branch element), a first reflection mirror 15, a second reflection mirror 16, a collecting lens 17, a diffusion element 18, a pickup system 19, a collimating and collecting system 20, a wavelength conversion element 21, an optical integration system 22, a polarization conversion element 23, a superimposing lens 24, a first sensor 25, a branch mirror control device 26, a branch mirror moving device 27, a mirror for monitoring amount of light 28, a light sensor unit 29, and a light source control device 30.

The light source unit 11, the collimating system 12, the dichroic mirror 13, the collimating and collecting system 20, and the wavelength conversion element 21 are provided in this order on an optical axis AX1. The second reflection mirror 16, the collecting lens 17, the diffusion element 18, the pickup system 19, the dichroic mirror 13, the optical integration system 22, the polarization conversion element 23, and the superimposing lens 24 are provided in this order on an optical axis AX2 orthogonal to the optical axis AX1.

Figure 3:
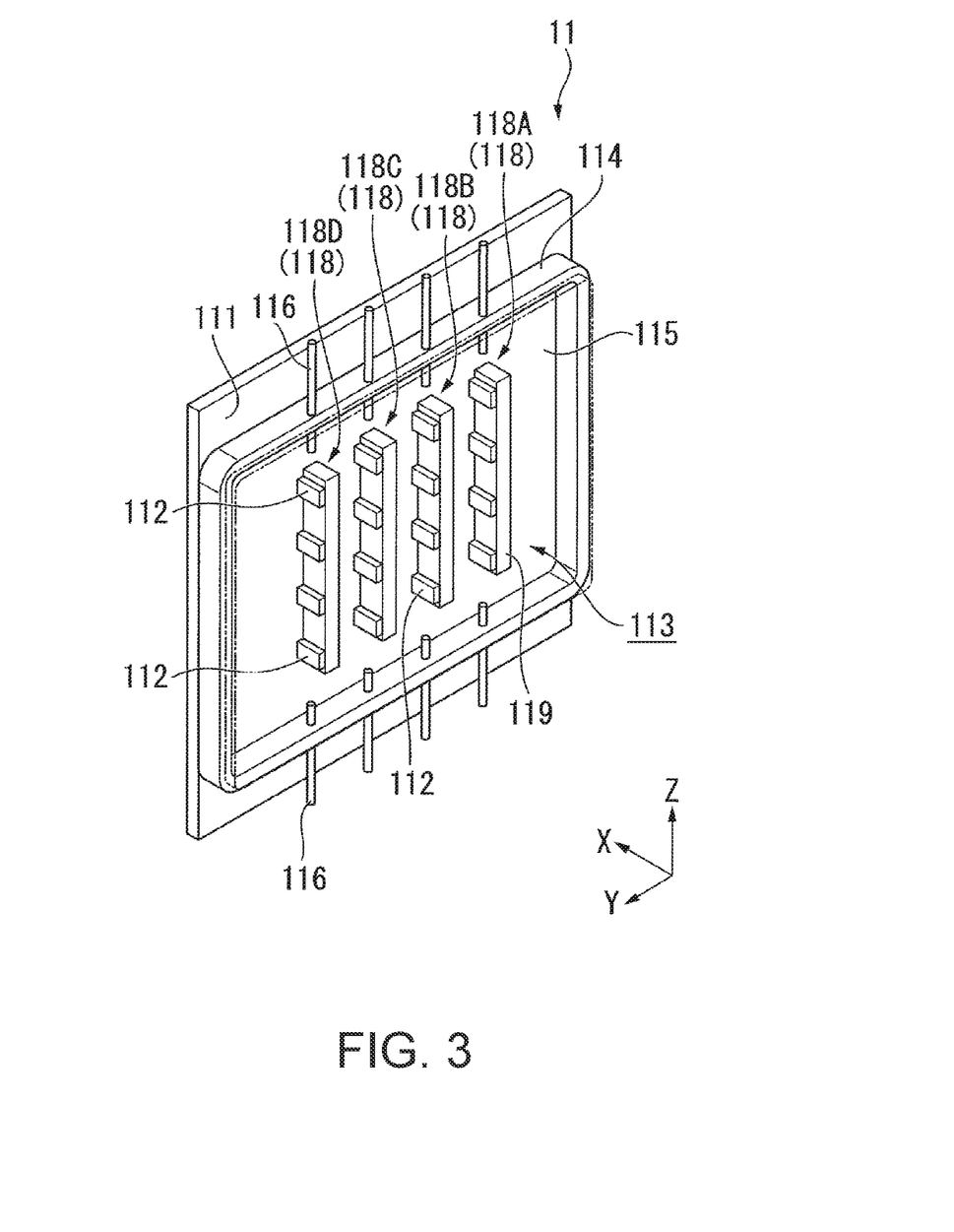
FIG. 3 is a perspective view of a light source unit.

FIG. 3 is a perspective view of the light source unit 11.

As shown in FIG. 3, the light source unit 11 includes a substrate 111, a light source array 113 having a plurality of light emitting devices 112 arranged in an arran form, a frame 114, a cover glass 115, and a plurality of electrode terminals 116. The substrate 111 is formed using e.g. a metal with higher heat conductivity such as copper. Note that, for simplification of the drawing, the wires connecting the electrode terminals 116 to the light emitting devices 112 are not shown.

The light source array 113 is housed in a space surrounded by the substrate 111, the frame 114, and the cover glass 115. In the embodiment, one light source region 118 has a configuration in which four of the light emitting devices 112 are arranged at predetermined intervals in a Z-direction. The light source array 113 has a configuration in which the four light source regions 118 are arranged at predetermined intervals in a Y-direction.

In the following description, sequentially from the right side in FIG. 3, the respective four light source regions 118 are referred to as "first light source region 118A", "second light source region 118B", "third light source region 118C", "fourth light source region 118D". As shown in FIG. 2, a plurality of lights output from the respective first light source region 118A, second light source region 118B, third light source region 118C, fourth light source region 118D are referred to as "first pencil of light L1", "second pencil of light L2", "third pencil of light L3", "fourth pencil of light L4", respectively. A pencil of light L0 formed by the first pencil of light L1, the second pencil of light L2, the third pencil of light L3, the fourth pencil of light L4 corresponds to a first color light in the appended claims.

The plurality of light emitting devices 112 include e.g. semiconductor lasers that output blue lights having a peak wavelength of light emission intensity of 446 nm. Of the plurality of light emitting devices 112, the lights output from part of the light emitting devices 112 function as blue lights LB1 as one component of the white illumination light WL output from the illumination device 100. The lights output from the other light emitting devices 112 function as excitation lights for exciting a fluorescent material layer of the wavelength conversion element 21, which will be described later.

The four light emitting devices 112 forming one light source region 118 are fixed to a single submount 119. The four light emitting devices 112 on the single submount 119 are electrically series-connected to one another. Thereby, the four light emitting devices 112 arranged in the Z-direction form a single series circuit. That is, each of the plurality of light source regions 118 includes the plurality of light emitting devices 112 series-connected to one another.

Two of the electrode terminals 116 are connected to the single series circuit. One electrode terminal 116 functions as a positive terminal and the other electrode terminal 116 functions as a negative terminal, and currents are supplied to the light emitting devices 112 by the two electrode terminals 116.

Figure 4:
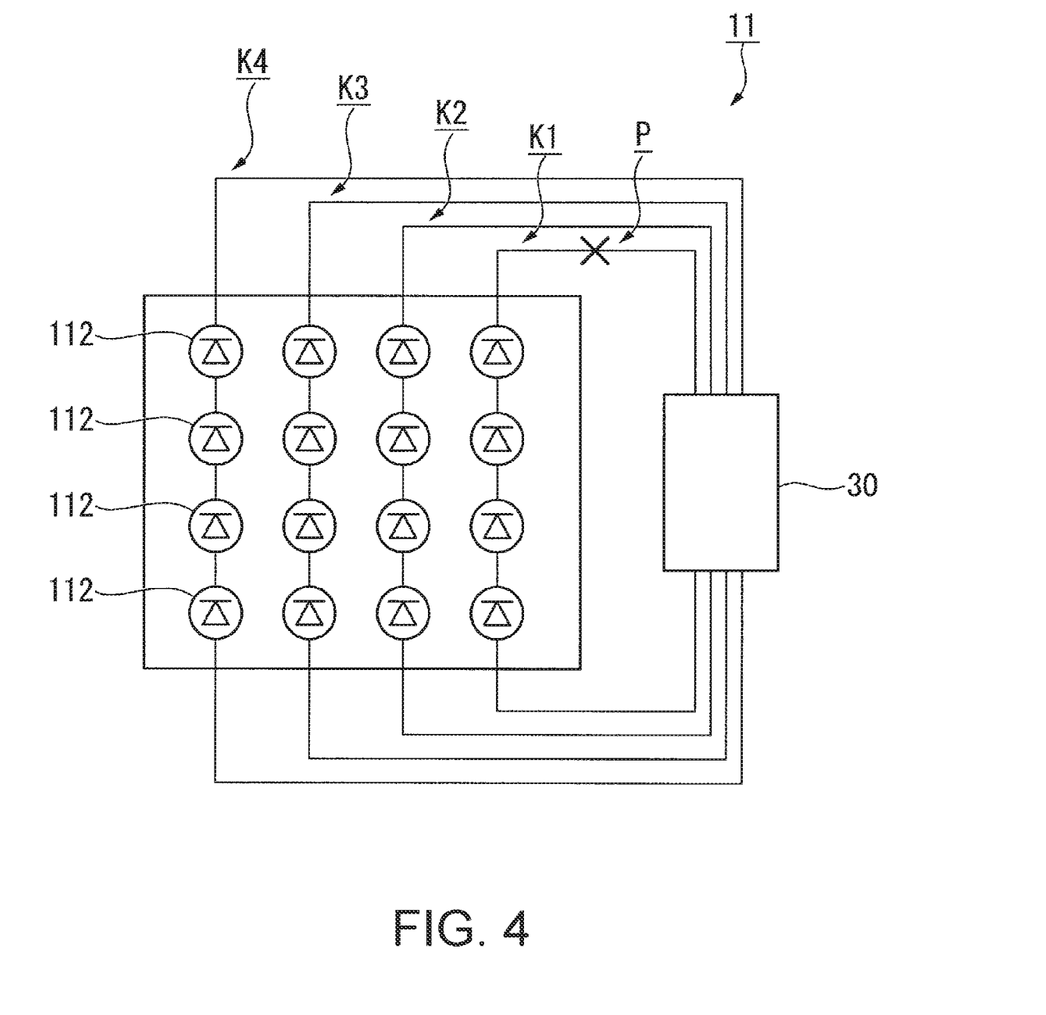
FIG. 4 is an equivalent circuit diagram of the light source unit.

FIG. 4 is an equivalent circuit diagram of the light source unit 11.

The light source unit 11 includes first to fourth series circuits K1 to K4. Hereinafter, the series circuit formed by the four light emitting devices 112 of the first light source region 118A is referred to as the first series circuit K1, the series circuit formed by the four light emitting devices 112 of the second light source region 118B is referred to as the second series circuit K2, the series circuit formed by the four light emitting devices 112 of the third light source region 118C is referred to as the third series circuit K3, and the series circuit formed by the four light emitting devices 112 of the fourth light source region 118D is referred to as the fourth series circuit K4.

The respective first to fourth series circuits K1 to K4 are independently connected to the light source control device 30. The light source control device 30 individually controls the currents supplied to the respective first to fourth series circuits K1 to K4.

As shown in FIG. 2, the collimating system 12 has a plurality of collimator lenses 121. The collimating system 12 nearly parallelizes the respective plurality of lights output from the plurality of light emitting devices 112. The collimator lenses 121 are formed using convex lenses.

The branch mirror 14 is provided in an optical path of one of the pencils of light L1 to L4. The branch mirror 14 has a strip shape and is placed so that the longitudinal direction may be along the Z-direction. The position of the branch mirror 14 can be adjusted over a range from the optical path of the first pencil of light L1 to the optical path of the fourth pencil of light L4 in the arrangement direction (Y-direction) of the plurality of light source regions 118. In normal use, for example, the branch mirror 14 is placed in the optical path of the first pencil of light L1.

The branch mirror moving device 27 moves the branch mirror 14 in the arrangement direction (Y-direction) of the four light source regions 118. The branch mirror moving device 27 includes e.g. a known sliding mechanism having a slide rail, motor, etc.

The first pencil of light L1 output from the first light source region 118A and traveling in the −X-direction is reflected by the branch mirror 14 and the traveling direction thereof is bent in the −Y-direction. On the other hand, the second to fourth pencils of light L2 to L4 output from the second to fourth light source regions 118B to 118D do not enter the branch mirror 14, but travel straight in the −X-direction. In this manner, the branch mirror 14 branches the lights output from the light source unit 11 to a first component (first pencil of light L1) and a second component (second to fourth pencils of light L2 to L4) traveling in the different directions from each other. In this regard, the first pencil of light L1 as the first component corresponds to the blue lights LB1. The second component corresponds to the excitation lights.

The first pencil of light L1 output from the branch mirror 14 is sequentially reflected by the first reflection mirror 15 and the second reflection mirror 16 and enters the collecting lens 17. The collecting lens 17 collects and enters the first pencil of light L1 into the diffusion element 18. The second reflection mirror 16 reflects many components of the entering blue lights LB1, but transmits slight components thereof. Of the blue lights LB1, the components transmitted through the second reflection mirror 16 are called blue light LB0.

The first sensor 25 is provided at the downstream of the second reflection mirror 16. Of the first pencil of light L1, the components transmitted through the second reflection mirror 16 enter the first sensor 25. The first sensor 25 detects the amount of the entering light. The first sensor 25 of the embodiment corresponds to a first photodetector in the appended claims.

The branch mirror control device 26 controls the position of the branch mirror 14 so that the branch mirror 14 may be located in one of the optical paths of the first to fourth pencils of light L1 to L4 based on the detection result of the amount of light by the first sensor 25.

The diffusion element 18 includes a diffusion plate 181 and a motor 182 for rotating the diffusion plate 181 about a rotation axis. The diffusion element 18 diffuses the blue light LB1, and thereby, outputs the light as a blue diffused light.

The pickup system 19 nearly parallelizes the blue light LB1 output from the diffusion element 18. The pickup system 19 includes a first pickup lens 191 and a second pickup lens 192. The first pickup lens 191 and the second pickup lens 192 are formed using convex lenses.

The dichroic mirror 13 has a property of transmitting lights in the blue range and reflecting lights in the yellow range. The dichroic mirror 13 is placed to form angles of 45° with respect to the optical axis AX1 and the optical axis AX2. The second component output from the light source unit 11 is transmitted through the dichroic mirror 13 and travels toward the collimating and collecting system 20.

The collimating and collecting system 20 nearly collects and enters the second component output from the dichroic mirror 13 into a fluorescent material layer 212 of the wavelength conversion element 21, and nearly parallelizes a fluorescent light LY output from the fluorescent material layer 212. The collimating and collecting system 20 includes a first convex lens 201 and a second convex lens 202.

The wavelength conversion element 21 converts the second component into the fluorescent light LY. The wavelength conversion element 21 has the fluorescent material layer 212, a substrate 213 that supports the fluorescent material layer 212, and a fixing member 214 that fixes the fluorescent material layer 212 to the substrate 213. The substrate 213 is formed using e.g. a metal material with higher heat conductivity such as copper.

The fluorescent material layer 212 contains e.g. a fluorescent material to be excited by absorption of the excitation light having a wavelength of 446 nm. The fluorescent material excited by the excitation light generates the Yellow fluorescent light LY having a peak wavelength in e.g. a wavelength range from 500 to 700 nm. The fluorescent material layer 212 includes a base material of an organic material and an activator agent as a light emission center diffused in the base material. The fluorescent material layer 212 is formed using a YAG fluorescent material of e.g. $(Y,Gd)_3(Al,Ga)_5O_{12}(YAG:Ce)$ with Ce as the activator agent.

Reflection layers (not shown) formed using a metal having higher reflectance such as silver or aluminum are provided on the side surfaces and the bottom surface of the fluorescent material layer 212. The excitation light and the fluorescent light inside of the fluorescent material layer 212 are reflected by the reflection layers. According to the configuration, the fluorescent light LY is output from the surface on the side into which the second component has entered.

The fluorescent light LY output from the wavelength conversion element 21 is parallelized by the collimating and collecting system 20, and then, reflected by the dichroic mirror 13 and enters the optical integration system 22. The blue light LB1 output from the pickup system 19 and the fluorescent light LY output from the collimating and collecting system 20 are combined by the dichroic mirror 13 into the white illumination light WL.

The optical integration system 22 includes a first lens array 221 and a second lens array 222. The first lens array 221 has a plurality of lenses 225 for dividing the illumination light WL output from the dichroic mirror 13 into a plurality of partial pencils of light.

The second lens array 222 includes a plurality of lenses 226 corresponding to the plurality of lenses 225 of the first lens array 221. The second lens array 222 forms images of the respective lenses 225 of the first lens array 221 near image formation areas of the respective light modulation device for red light 400R, light modulation device for green light 400G, and light modulation device for blue light 400B with the superimposing lens 24.

The polarization conversion element 23 converts the respective partial pencils of light divided by the first lens array 221 into linearly-polarized pencils of light. The polarization conversion element 23 has a polarization separation layer, a reflection layer, and a retardation layer (not shown).

The superimposing lens 24 collects the respective partial pencils of light from the polarization conversion element 23 and superimposes the partial pencils of light near the image formation areas of the respective light modulation device for red light 400R, light modulation device for green light 400G, and light modulation device for blue light 400B.

The mirror for monitoring amount of light 28 is provided in the optical path between the optical integration system 22 and the polarization conversion element 23. The mirror for monitoring amount of light 28 is placed to form an angle of 45° with respect to the optical axis AX2. The mirror for monitoring amount of light 28 transmits part of the entering illumination light WL and reflects the other. The light transmitted through the mirror for monitoring amount of light 28 enters the polarization conversion element 23 and the light reflected by the mirror for monitoring amount of light 28 enters the light sensor unit 29. Note that the mirror for monitoring amount of light 28 may be provided in the optical path between the polarization conversion element 23 and the superimposing lens 24.

The light sensor unit 29 includes a dichroic mirror 291, a second sensor 292, and a third sensor 293. The light extracted by the mirror for monitoring amount of light 28 enters the light sensor unit 29 and is separated into a blue light LB2 and a yellow light LY2 by the dichroic mirror 291. The second sensor 292 measures the amount of the blue light LB2. The third sensor 293 measures the amount of the yellow light LY2.

The output from the light sensor unit 29 (the amount of the blue light LB2 and the amount of the yellow light LY2) is output to the light source control device 30. The light source control device 30 individually adjusts the currents to be supplied to the first to fourth series circuits K1 to K4 based on the output from the light sensor unit 29, and controls the output of the respective first to fourth light source regions 118A to 118D of the light source unit 11.

Here, as shown in FIG. 4, suppose that an open failure P has occurred in the first series circuit K1. In this regard, no currents are supplied to all of the four light emitting devices 112 contained in the first series circuit K1 and all of these light emitting devices 112 are not lighted. If the branch mirror 14 is not movable in the arrangement direction of the plurality of light source regions 118, the first pencil of light L1 that should be branched as the first component by the branch mirror 14 is not output from the light source unit 11, and the intensity of the first component is zero. As a result, it may be impossible for the projector 1 to display an image in a predetermined color.

On the other hand, in the illumination device 100 according to the invention, the open failure may be addressed in the following manner.

Figure 6:
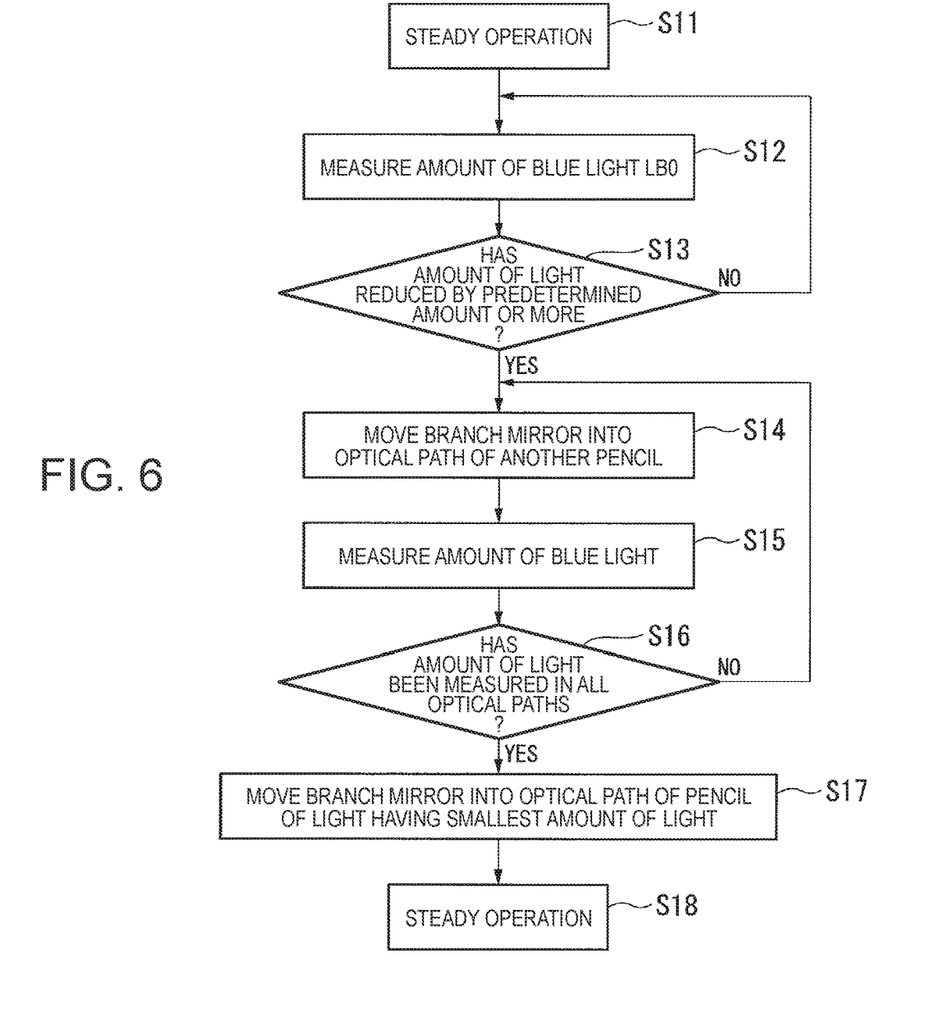
FIG. 6 is a flowchart showing a movement procedure of a branch mirror when an open failure occurs.

FIG. 6 is a flowchart showing a movement procedure of the branch mirror 14 when the open failure occurs.

While the projector 1 performs steady operation (step S11), the first sensor 25 measures the amount of the blue light LB0 transmitted through the second reflection mirror 16 (step S12). The output from the first sensor 25, i.e., the amount of the blue light LB0 is sent to the branch mirror control device 26 whenever necessary. The measurement of the amount of the blue light LB0 may be performed continuously or intermittently.

The branch mirror control device 26 compares the amount of the blue light LB0 measured at the present time with the amount of the blue light LB0 measured at the previous time, and determines whether or not the amount of the blue light LB0 (the output from the first sensor 25) has reduced by a predetermined amount or more (step S13). If the amount of the blue light LB0 has not reduced or the reduced amount of the blue light LB0 is less than the predetermined amount, the branch mirror control device 26 determines that the open failure has not occurred in the first series circuit K1.

On the other hand, if the amount of the blue light LB0 has reduced by the predetermined amount or more, the branch mirror control device 26 determines that the open failure has occurred in the first series circuit K1. Note that the case where the light emitting devices 112 do not laser-oscillate and a failure in the mode of light emission as the light emitting diodes occurs may be considered. The failure is not the open failure, however, if the amount of the blue light LB0 has reduced by the predetermined amount or more, the failure may be treated the same as the open failure because the amount of light is extremely lower than that at laser oscillation.

Then, the branch mirror control device 26 controls the branch mirror moving device 27 to move the branch mirror 14 into the optical path of the other pencil of light, e.g. the pencil of light L2 (step S14), and measures the amount of the blue light LB0 (step S15).

Then, the branch mirror control device 26 determines whether or not the amount of the blue light LB0 has measured with respect to all of the other pencils of light (step S16).

If the determination result is no, steps S14, S15 are also executed with respect to the pencils of light L3, L4. The measurement of the amount of the blue light LB0 is performed with respect to all of the other pencils of light L2 to L4 than the pencil of light L1 because the amounts of output light of the light emitting devices 112 have individual differences and the amounts of the pencils of light L2, L3, L4 may be different from one another. In the embodiment, suppose that the amount of the third pencil of light L3 is the smallest.

Figure 5:
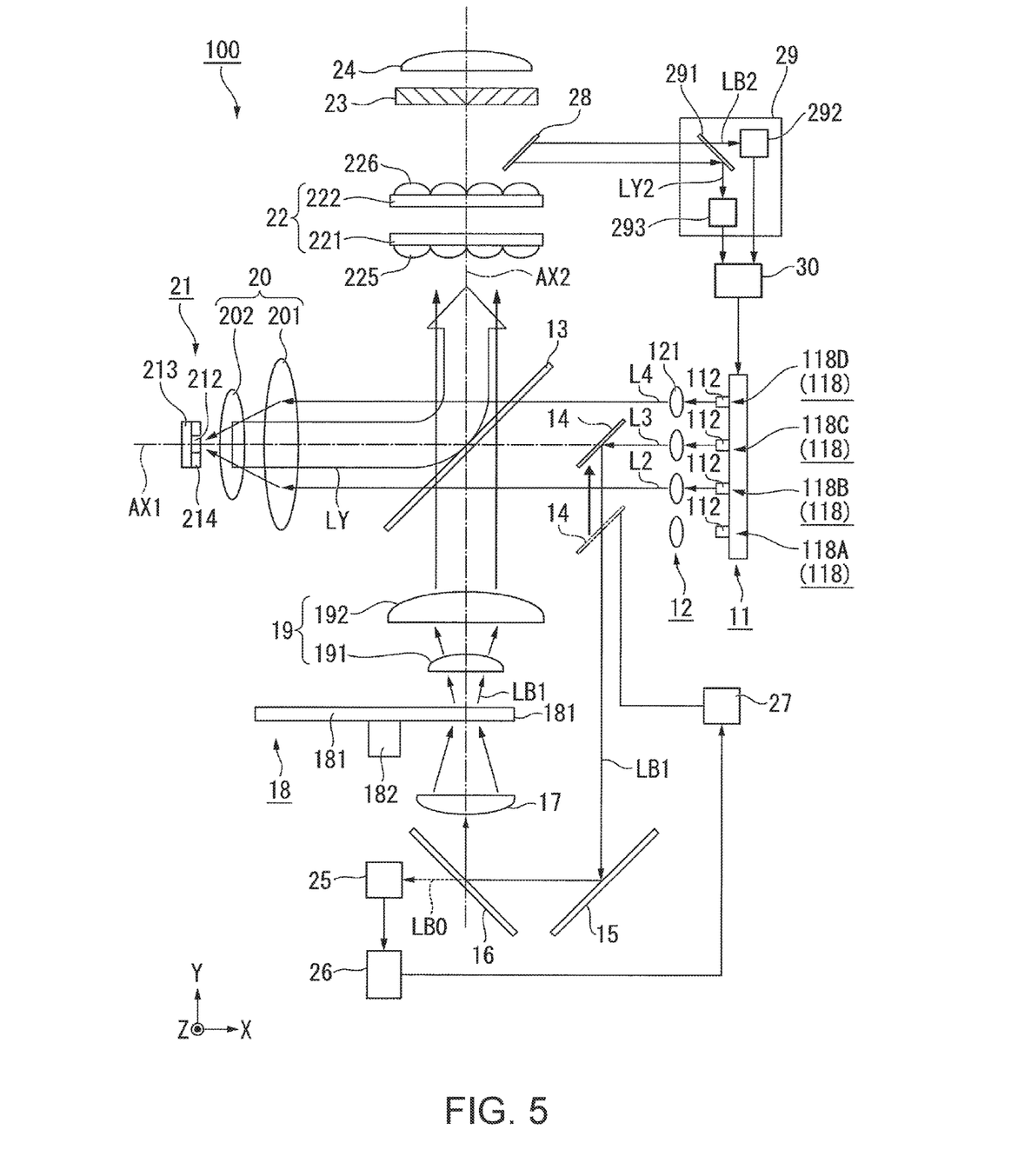
FIG. 5 is a diagram for explanation of an action of the illumination device.

The amount of the blue light LB0 is measured in the optical paths of all of the other pencils of light, and then, the branch mirror control device 26 compares the three measurement values obtained at step S15 and, as shown in FIG. 5, moves the branch mirror 14 into the optical path of the third pencil of light L3 having the smallest amount of the blue light LB0 of the pencils of light L2 to L4 (step S17).

Thereby, not the first pencil of light L1, but the third pencil of light L3 is branched from the pencil of light L0. In this regard, the third pencil of light L3 corresponds to the first component, i.e., the blue light LB1. The second pencil of light L2 and the fourth pencil of light L4 correspond to the second component.

Then, with the branch mirror 14 located in the optical path of the third pencil of light L3, the projector 1 continues the steady operation again (step S18).

As described above, in the illumination device 100 of the embodiment, even if the open failure occurs in the first series circuit K1 and the first pencil of light L1 is not output, the branch mirror 14 is moved into the optical path of the third pencil of light L3, and thereby, the first component may be extracted from the light source unit 11. As a result, the projector 1 may display a color image.

Note that, only by the movement of the branch mirror 14, white balance of the projector may be lost and colors of the image may change for the following reasons.

Before the open failure occurs, the pencil of light from one light source region 118 is assigned to the first component and the pencils of light from the three light source regions 118 are assigned to the second component, and the ratio of the respective components is nearly 1:3.

However, as shown in FIG. 5, after the open failure occurs, the pencil of light from one light source region 118 is assigned to the first component and the pencils of light from the two light source regions 118 are assigned to the second component, and the ratio of the respective components is nearly 1:2 and the balance between the blue light LB1 and the fluorescent light LY changes. Compared to the ratio before the open failure occurs, the blue light LB1 is excessive.

Figure 7:
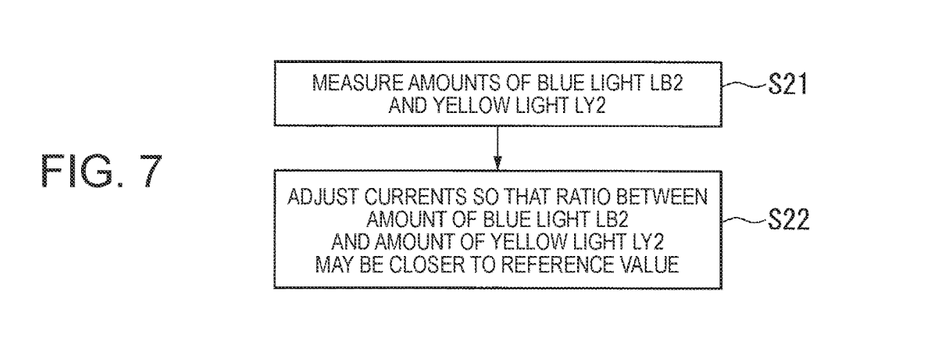
FIG. 7 is a flowchart showing an adjustment procedure of white balance.

Accordingly, in the projector 1 of the embodiment, the white balance is adjusted in the following procedure shown in FIG. 7.

As described above, when the open failure occurs in one series circuit, the ratio between the amounts of the blue light LB1 and the yellow light LY changes from that before the open failure occurs, and the white balance of the illumination light is lost.

Here, the light sensor unit 29 measures the amounts of the blue light LB2 and the yellow light LY2 (step S21). In the light source control device 30, the ratio between the amount of the blue light LB2 and the amount of the yellow light LY2 measured at the start of use of the projector 1 is stored in advance as a reference value. The light source control device 30 obtains and compares the present ratio between the amount of the blue light LB2 and the amount of the yellow light LY2 detected by the light sensor unit 29 with the reference value. As a result, if a difference between the present ratio and the reference value is beyond an allowable range, the currents supplied to the respective series circuits K2 to K4 are individually adjusted so that the present ratio may be closer to the reference value (step S22).

In the case shown in FIG. 5, the current supplied to the third series circuit K3 is reduced from that before the open failure occurs and the currents supplied to the second, fourth series circuits K2, K4 are increased from those before the open failure occurs, and thereby, the ratio between the amount of the blue light LB2 and the amount of the yellow light LY2 may be made closer to the reference value. Thus, the white balance is improved.

Further, in the embodiment, when the open failure occurs in the first series circuit K1, the branch mirror control device 26 moves the branch mirror 14 so that the component to be branched as the blue light LB1 may be changed to the third pencil of light L3 having the smallest amount of light of the second to fourth pencils of light L2 to L4. Accordingly, compared to the case where the branch mirror 14 is moved so that the component to be branched may be changed to the second pencil of light L2 or fourth pencil of light L4, the excessive amount of the blue light with respect to the yellow light may be made smaller. Thereby, the illumination device 100 with less waste may be obtained.

Furthermore, in the embodiment, the illumination device 100 includes the first sensor 25 for detection of the amount of the blue light LB0 and includes the second sensor 292 for detection of the amount of the blue light LB2. According to the configuration, compared to the case where the second sensor 292 is also used as a sensor for detection of the amount of the blue light LB0, accuracy of the movement control of the branch mirror 14 and the light amount control of the respective light source regions 118 may be respectively improved. Note that one of the first sensor 25 and the second sensor 292 may be provided and the sensor may be used for both uses for detection of open failure and adjustment of white balance.

The technical scope of the invention is not limited to the above described embodiment, but various changes can be made without departing from the scope of the invention.

For example, in the above described embodiment, the configuration in which one pencil of light from one light source region is branched by one branch mirror is exemplified, however, for example, a configuration in which two pencils of light from two light source regions are branched by one branch mirror may be employed. Or, the number of branch mirrors is not limited to one. Two pencils of light from two light source regions may be branched by two branch mirrors and, if an open failure occurs on the one branch mirror side, only the branch mirror may be moved.

The illumination device does not necessarily include the branch mirror moving device or branch mirror control device. It is only necessary that the branch mirror can be moved when an open failure occurs.

In the above described embodiment, each light source region includes the light emitting devices arranged in one row in the Z-direction. That is, the plurality of light emitting devices are divided with respect to each row and each row forms one light source region. However, for example, the four light emitting devices arranged in two rows and two columns and series-connected to one another may form one light source region. Or, the numbers of light emitting devices of the respective light source regions may be different from one another. It is only necessary that one light source region includes one or more light emitting devices. That is, one light emitting device may form one light source region.

As the light branch element, an optical element such as a prism may be used in place of the mirror.

In addition, the numbers, shapes, materials, placements, etc. of the respective component elements forming the projector can be changed as appropriate. Further, as the light source device, not limited to the above described liquid crystal panel, but e.g. a digital mirror device may be used.

In the above described embodiment, the example in which the illumination device according to the invention is mounted on the projector is shown, but the device is not limited to that. The illumination device according to the invention may be applied to lighting equipment, headlights of automobiles, or the like.

The entire disclosure of Japanese Patent Application No. 2017-046277, filed on Mar. 10, 2017 is expressly incorporated by reference herein.

What is claimed is:

1. An illumination device comprising:
a light source unit including a plurality of light source regions and outputting a first color light;
a light branch element that reflects a light output from at least one light source region of the plurality of light source regions and branches the first color light into a first component and a second component traveling in different directions from each other, a position of the light branch element in an arrangement direction of the plurality of light source regions being adjustable;
a wavelength conversion element provided in an optical path of the second component and excited by the second component to output a fluorescent light containing a second color light;
a first photodetector into which a part of the first component enters;
a light branch element moving device that moves the light branch element; and
a light branch element control circuit that controls the light branch element moving device, the light branch element control circuit having a function of changing a component to be branched as the first component of the first color light by controlling the light branch element moving device to move the light branch element in the arrangement direction when an output from the first photodetector is reduced by a predetermined amount or more.

2. The illumination device according to claim 1, further comprising:
a light source control circuit for controlling output of each of the plurality of light source regions.

3. The illumination device according to claim 2, further comprising:
a light sensor unit into which a part of the first component and a part of the second color light enter
wherein the light source control circuit is adapted to control the output of the respective plurality of light source regions based on output from the light sensor unit.

4. The illumination device according to claim 1, wherein:
the plurality of light source regions include a first light source region having a first output, a second light source region having a second output, and a third light source region having a third output smaller than the second output; and
the light branch element control circuit has a function of changing the component to be branched as the first component of the first color light from the light output from the first light source region to the light output from the third light source region by controlling the light branch element moving device.

5. A projector comprising:
the illumination device according to claim 1;
a light modulation unit that modulates the first component and the fluorescent light output from the illumination device according to image information to form an image light; and
a projection system that projects the image light.

6. A projector comprising:
the illumination device according to claim 2;
a light modulation unit that modulates the first component and the fluorescent light output from the illumination device according to image information to form an image light; and
a projection system that projects the image light.

7. A projector comprising:
the illumination device according to claim 3;
a light modulation unit that modulates the first component and the fluorescent light output from the illumination device according to image information to form an image light; and
a projection system that projects the image light.

8. A projector comprising:
the illumination device according to claim 4;
a light modulation unit that modulates the first component and the fluorescent light output from the illumination device according to image information to form an image light; and
a projection system that projects the image light.

* * * * *